Figure 5:
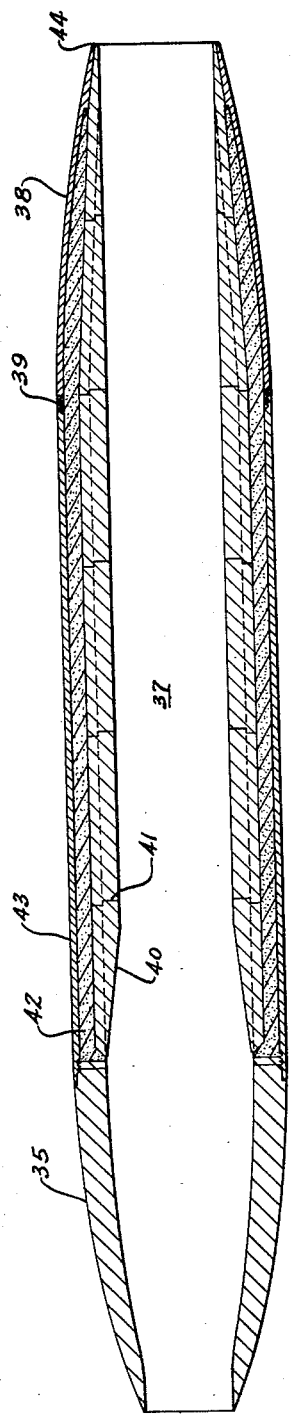

Nov. 5, 1957 — A. A. TOPINKA — 2,811,829
RAM JET EMPLOYING CARBON LAYER OF INSULATION FOR SOLID CARBON PROPELLANT
Filed Dec. 4, 1952 — 2 Sheets-Sheet 1
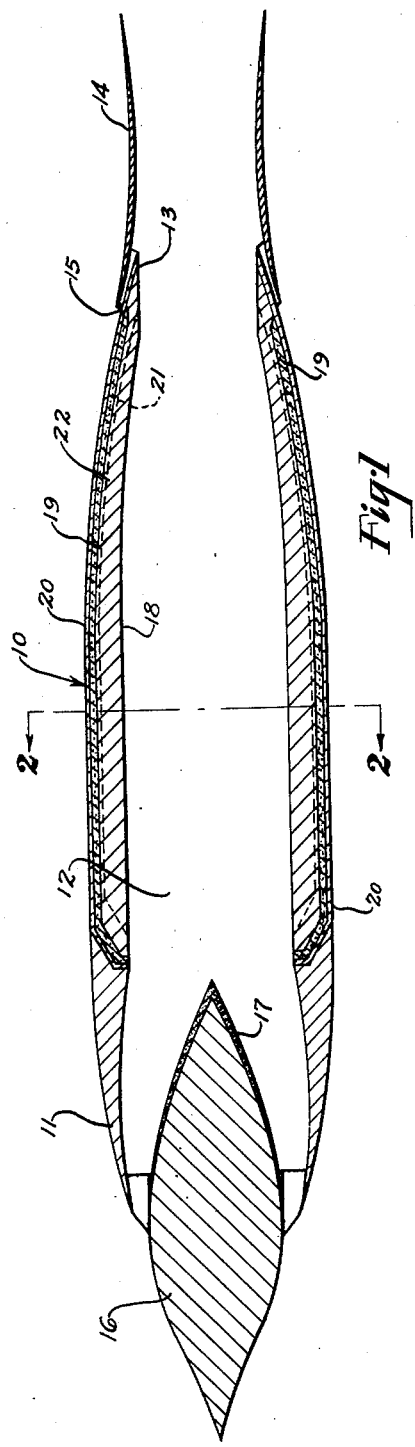
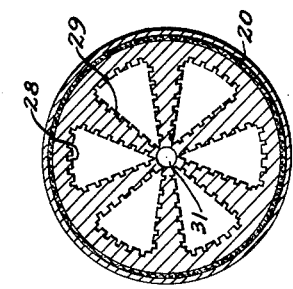
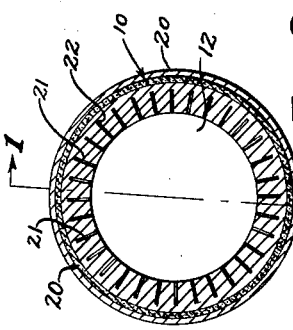
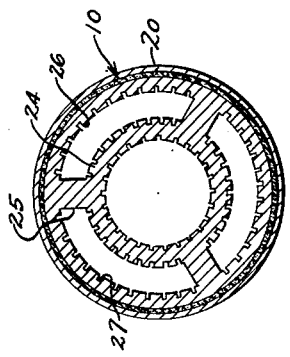
INVENTOR.
ALFRED A. TOPINKA
BY Jay & Jay
ATTORNEYS INVENTOR.
ALFRED A. TOPINKA
BY Fay & Fay
ATTORNEYS 2,811,829
Patented Nov. 5, 1957

2,811,829

RAM JET EMPLOYING CARBON LAYER OF INSULATION FOR SOLID CARBON PROPELLANT

Alfred A. Topinka, Cleveland, Ohio

Application December 4, 1952, Serial No. 324,012

4 Claims. (Cl. 60—35.6)

This invention, relating as indicated to a ram jet, is more particularly directed to a solid propellant ram jet of novel design for use in piloted aircraft or guided missiles. The invention particularly relates to a ram jet using a solid propellant, such as carbon and/or graphite or combinations of both, as a fuel in place of the more common liquid fuel propellants.

In today's world, jets, rockets and missiles must travel at higher speed and with greater efficiency. To do this a ram jet using a novel design and new fuel seems necessary.

An object of this invention is to produce a novel design of ram jet capable of considerably greater efficiency, long burning time and improved performance.

Another object of this invention is to produce a simplified ram jet using carbon and graphite or both as a fuel and using a good insulator and a heat resistant metallic section in a simplified construction and for better combustion of the fuel.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of the various mechanical forms in which the principle of the invention may be used.

In the drawings:

Fig. 1 is a cross-sectional view of my new and improved ram jet showing the relative proportions of a missile and the principal parts thereof along the line 1—1 of Fig. 2, Fig. 2 is a cross-sectional view along the lines 2—2 of Fig. 1, illustrating the combustion zone, the propellant and heat insulation, Fig. 3 is a cross-sectional view of an alternate modification along the lines 2—2 of Fig. 1, Fig. 4 is a second alternate modification along the lines 2—2 of Fig. 2, and Fig. 5 is a modification of the over-all ram jet construction.

Ram jet engines of various designs are well known in the art but, in general, these have employed liquid fuel propellants and have been extremely difficult to operate successfully and have required a great number of controls and auxiliary pieces of equipment to operate the jet.

This invention basically consists of a ram jet having carbon for the fuel propellant, and having only such necessary controls as may be needed for the guiding mechanism, but few, if any, for the ram jet in and of itself. Basically then, it will be understood that a ram jet or Athodyd (aero-thermo-dynamic-duct) is particularly efficient in the speed range of 1500 to 2500 miles per hour but that it has been handicapped in some respects because it must be brought up to speed. Because of its efficiency and simplicity it is admirably adapted to guided missiles and piloted aircraft.

It is now proposed to use a new and different fuel, namely solid carbon or graphite, which has a favorable heat of combustion relative to the other more usual rocket and jet fuels, while at the same time it may be controlled and employed successfully in an annular shape with insulation and other components within a shell having the usual diffuser, together with the combustion chamber and nozzles. The reasons for employing carbon is that the high speed which these ram jets may be subjected to will not flame out the incandescent carbon, while at the same time carbon provides a very refractory combustion chamber for high temperature combustion.

Of course, a further advantage is that carbon or graphite have excellent thermal shock and retain their strength at the higher temperatures in the combustion zone. It is further understood that it has a very high sublimation temperature, together with high specific gravity 2.25. When this is taken together with its high heat of combustion, it will be seen that the fuel occupies a relatively small amount of space as compared with other fuels. This combination further permits the carbon to be part of the structural elements of the missile during flight. In this application where carbon is referred to as the fuel it is to be understood that graphite is meant to be included as a useable alternative.

The mixture for the combustion to supply heat and transform it into kinetic energy involves the burning of carbon as follows:

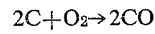

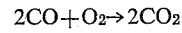

Reaction must be noted, however, as being in two stages involving the oxidation of carbon from oxygen in the air to carbon monoxide. The second reaction with more oxygen is the oxidation of the monoxide to dioxide. This completes the oxidation except for the fact that the nitrogen passes through unchanged and is a diluent. It hardly need be stated that a particular advantage of ram jets in the supersonic speed range is that they do not have to carry the oxidizing agent required to supply the power but rather get this from the air even though it may be rarified at high altitude. This, together with their relatively high efficiency and speed, is important.

The high speeds, of course, produce extremely high compression ratios and it is when these compression ratios are reached that any efficiency occurs in transforming the oxidation process to kinetic energy. In a ram jet of this type a compression ratio of ten to one would not be impossible. This would involve a speed of 2,000 to 2,500 miles per hour. Many well known rotating turbine jet engines operate at compression ratios of only 4.0–5.0 to 1. These may be somewhat limited as they have been by the metallurgical characteristics of available materials. This duct engine because of lack of moving parts and the very refractory nature of the combustion chamber has fewer limitations on its ultimate compression ratio. This would make for considerably greater efficiency of conversion of heat energy to kinetic energy and thereby make the missile go farther and faster to carry a greater payload. To accomplish this it might be well to compare the heat of combustion of the more common rocket and jet fuels and these are as follows:

Solid fuels:  Kg.-cal./gm.
    Graphite and carbon_____ 7.9
    Nitrocellulose_____ 2.6
    (Nitrocellulose has its $O_2$ self-contained)

Liquid fuels:
    Hydrogen _____ 29.1
    Gasoline and kerosene_____ 11.5
    Alcohol_____ 6.5

Though, of course, nitrocellulose is a common solid fuel in rockets, it has a relatively low heat of combustion. The heat of combustion of graphite or carbon is about 7.9 kg.-cal./gm. It may be raised about .5 kg.-cal./gm.

by preheating of the graphite or carbon with usual heating means and it is suggested that an oxy-acetylene flame, or electrical heat using conducting electrodes through the carbon would produce the initial temperature of 2,000° C. Thus it will be seen that about 5% to 7% of the energy could be supplied as latent energy in the material. The best take-off velocity might well be from 200 to 500 miles per hour, depending on the length of the missile, and in a horizontal direction with the usual methods, such as compressed air or rocket assisted take-off.

A brief discussion of the other fuels should be mentioned. These are, of course, hydrogen, which has a very high heat of combustion, but too low a specific gravity, and completely lacks handling ease, and gasoline and kerosene, which at present cannot be used in compression ratios higher than five to one in rotating turbine engines because of metallurgical considerations. Alcohol has been used and has good cooling properties with respect to combustion chambers, but has a low heat of combustion, and is always used in connection with missiles having self-contained oxygen.

This invention basically consists of an outer shell or body of usual design, shown generally at 10 with possibly some reinforcing ribs not shown. It is probable that a heat resistant alloy combining cobalt and nickel could be used. The missile has the usual diffuser 11, combustion chamber 12 and nozzle 13, but in addition has a complementary burning section 14, which improves the efficiency of the missile and into which additional air may be supplied through slots at 15. The payload appears in the nose portion at 16 with a suitable aerodynamic shape adapted for ram jet velocities, and is protected with heat insulation 17 from the combustion chamber 12. The solid fuel propellant 18 is annular in shape and protected from the shell proper 20 by a layer of lampblack or powdered carbon 19, which may be bound together with a binder, preferably one able to withstand upward of 300° C. The same insulation, either lampblack or powdered carbon, will be used to protect the payload in the high combustion zone at 12. The combustion zone and fuel has a plurality of slots 21 cut therein to a considerable depth shown at 22 to increase the burning surface of the solid fuel propellant. The propellant will be carbon or graphite and must be brought up to temperature in the neighborhood of 1750–2000° C. Carbon, however, begins to burn as low as 1100 or 1200° C., but by putting in the greater quantity of heat some of it may be used for latent heat and increase the energy of the missile.

Other modifications of this invention are shown in Fig. 3, which is a cross section of Fig. 1 along the lines 2—2 thereof. This shows a second annular ring 24 of carbon or graphite with a three point support 25 equally spaced from the outer ring 26. Serrations, or teeth, 27 occur at spaced intervals along each of the annular rings. The advantage of this construction is that considerably greater burning surface exists and the air is in contact with a larger amount of carbon.

Fig. 4 is another modification and this is a spoked construction, having serrations 28 in the wheel as well as on the spokes 29, which spokes join in a central hole 31. In each instance, of course, lampblack or powdered carbon 19 with a binder is used for insulation, since the insulation is a necessary part of the construction.

In connection with Fig. 5, this shows an over-all view of the missile without means for a payload in the nose, though this could be embodied in the diffuser structure 35. In this embodiment 35 is the diffuser shown solid, though it might have a payload or other controls. 37 is the combustion chamber and 38 is the removable nozzle section. Both the diffuser 35 and the nozzle 38 are fastened to the shell 43, for example, with a threaded connection as shown at 39. Within the combustion chamber there are annular carbon segments 40 of stepped construction 41 so that they interlock. A layer of lampblack or powdered carbon is used for insulation and this is shown at 42. The outer shell of alloy steel is shown at 43. Slots, of course, as previously described, occur in the carbon sections. This particular modification has no complementary burning section shown.

In addition there is a complementary burning section 14 provided with inlets for additional air containing oxygen, of course, and these are shown at 15. This complementary burning section is designed to take that portion of the carbon or carbon monoxide which may or may not have been completely oxidized and complete this oxidation. Under some circumstances it may not be necessary to have supplementary air but it would certainly increase the efficiency and more completely utilize the fuel if carbon monoxide is still present in the gases leaving the combustion chamber.

I have found that a very thin layer of insulation is required, and even for the larger size missiles up to one-half inch would be sufficient. The advantages of this particular insulation is that it is not only an extremely good heat insulator but may be consumed in the last stages of burning of the missile. The insulation is a supplementary fuel when its function as heat insulation is no longer required. The heat insulation should also be an electrical nonconductor. This is particularly important when an electric current is to be used to preheat the fuel by electrical resistance. Lampblack with a binder is a good material for this purpose.

The particular advantages of this construction of a ram jet is its high operating temperature and compression ratio. Approximately 50 to 80% of this missile can be fuel by weight, thus making for very high ultimate velocities. It is further evident that the controls are the essence of simplicity and that the combustion chamber is very refractory and has a high specific gravity, and under these conditions has excellent thermal shock resistance. No external cooling is necessary, and the heat insulation is a part of the fuel. This limits the necessity for metering fuel and air and the equipment associated with this operation.

A further advantage is the simplicity and low cost of the construction. The missile could be particularly used for point to point missiles or point to air missiles.

In connection with the fuel, I have found that a carbon useful in brushes, such as Grade E 772 supplied by Superior Carbon Company of Cleveland, Ohio, may be used, though, of course, others having similar characteristics would perform equally well.

Various means may be used for preheating the missile and one of these was described earlier. The advantage in preheating is, of course, that there is latent heat in the fuel to increase the over-all energy which can be obtained therefrom.

When either of these heating methods are used it will be seen that the carbon is brought up to temperature. Supplementary means are used for accelerating the missile and when it reaches a velocity slightly in excess of that in which the wings will support the missile in horizontal flight, it will continue to accelerate by itself. The missile will proceed in a horizontal direction, building up speed, and then climb to any desirable altitude, depending on the action taken with the controls in controlling said missile. Fins and wings would be required during this initial stage but are not incorporated as a part of the ram jet missile, since they are conventional in missile design.

Although the present invention has been described in connection with a few preferred embodiments thereof, variations and modifications may be resorted to by those skilled in the art without departing from the principles of the invention. All of these variations and modifications are considered to be within the true spirit and scope of the present invention, as disclosed in the foregoing description and defined by the appended claims.

I claim:

1. A ram jet having a tubular shell with a diffuser, a nozzle and a combustion chamber, said combustion chamber being lined with solid carbon as a fuel and propellant, said carbon being protected by a layer of insulation from the shell from the group consisting of lamp black and powdered carbon.

2. The ram jet of claim 1, in which the fuel has a plurality of longitudinal slots therein.

3. A ram jet having a tubular shell, a diffuser, a nozzle and a combustion chamber, said combustion chamber being lined with solid carbon as a fuel and propellant, said carbon being protected from the shell by a layer of insulation of the group consisting of lamp black and powdered carbon, and a complementary burning section following the nozzle comprising means for an additional air inlet, and a lining of suitable refractory material.

4. The ram jet of claim 3, in which the diffuser incorporates a payload having an aerodynamic shape adapted for ram jet velocities.

References Cited in the file of this patent

UNITED STATES PATENTS

| | | |
|---|---|---|
| 1,680,451 | Chandler | Aug. 14, 1928 |
| 2,487,588 | Price | Nov. 8, 1949 |
| 2,684,629 | Nordfors | July 27, 1954 |

FOREIGN PATENTS

| | | |
|---|---|---|
| 2,554 | Great Britain | July 3, 1877 |
| 648,878 | Germany | Aug. 11, 1937 |
| 857,780 | France | Apr. 26, 1940 |